United States Patent [19]
Cannon et al.

[11] Patent Number: 6,041,402
[45] Date of Patent: Mar. 21, 2000

[54] DIRECT VECTORED LEGACY INSTRUCTION SET EMULATION

[75] Inventors: William J. Cannon, Centerville; David K. Remnant, Dayton; Paul D. Ward, Franklin; Timothy R. Hoerig, Beavercreek, all of Ohio

[73] Assignee: TRW Inc., Redondo Beach, Calif.

[21] Appl. No.: 09/002,960

[22] Filed: Jan. 5, 1998

[51] Int. Cl.[7] .................................................. G06F 9/30
[52] U.S. Cl. .......................................... 712/200; 395/500
[58] Field of Search .............................. 712/200; 395/500

[56] References Cited

U.S. PATENT DOCUMENTS

| | | | |
|---|---|---|---|
| 5,481,684 | 1/1996 | Richter | 395/375 |
| 5,586,270 | 12/1996 | Rotier | 395/282 |
| 5,748,912 | 5/1998 | Lee | 395/282 |
| 5,828,897 | 10/1998 | Kirsch | 395/800.43 |

*Primary Examiner*—Eric Coleman
*Attorney, Agent, or Firm*—Michael S. Yatsko

[57] ABSTRACT

A method and apparatus for emulating instructions of one microprocessor ("legacy instructions") with instructions of another microprocessor with an incompatible instruction set which provides increased throughput relative to known emulation systems. In particular, the legacy instructions are translated into direct vectors to software routines for each legacy instruction. Rather than fetching the legacy instruction and interpreting the instruction in software, the emulation system and method in accordance with the present invention fetches the direct vectors to the software routines which emulate the legacy instructions. The legacy instructions can either be translated by way of software when the legacy memory is loaded or modified, or by way of hardware when legacy memory is accessed. By fetching the direct vectors, the need for software-based look-up tables for interpreting the legacy instructions is obviated. As such, the probability of cache misses is greatly reduced which increases the throughput of the system.

5 Claims, 3 Drawing Sheets

DIRECT VECTORED LEGACY INSTRUCTION SET EMULATION

BACKGROUND OF THE INVENTION

1. Field of the Invention

The present invention relates to a method and apparatus for emulating instructions of a microprocessor and more particularly to a method and apparatus which enables a microprocessor to be upgraded with an upgrade microprocessor with an incompatible instruction set.

2. Description of the Prior Art

It is known that microprocessors are configured with different instruction set architectures (ISA). The ISA determines the instruction set for a particular microprocessor. Application programs are executed by the microprocessors normally written in relatively high level language, which is compiled into machine instructions compatible with the instruction set for the specific microprocessor. Microprocessors are increasingly being designed to execute instructions faster and faster. As such, systems incorporating such microprocessors are often upgraded to increase the speed of the system. Unfortunately, depending on the particular upgrade, often times the instruction set of the upgrade microprocessor is incompatible with the instruction set of the microprocessor to be replaced ("legacy microprocessor"). As such, in such applications, the existing application programs often need to be rewritten in new and modern computer languages with modern compilers. Unfortunately, such an undertaking can be quite cumbersome and expensive.

Due to the age and obsolescence of many existing embedded computers, the reliability of such computers is rapidly declining while maintenance is becoming more difficult and costly to achieve. As such, it is sometimes required to replace outdated "legacy" microprocessors with newer technology microprocessors. To work around instruction set incompatibilities, emulation systems (emulators) have been developed. Emulators are known which emulate the instruction set of the legacy microprocessor in order to enable the instructions of the legacy microprocessor to be "executed" by a different microprocessor. Both software and hardware based emulators are known. For example, various software emulators for the F-16 avionics integration support facility (AISF) common modular environment (COMET) are described in document no. F-16AISF-COMET-100 (EMULATORS-SWD-A, dated May 21, 1996). Hardware based emulators for military standard MIL-STD-1750A, are discussed in the document entitled Line Replaceable Unit Emulator Hardware Product Fabrication Specification, document no. SFF20702 dated Apr. 16, 1996.

Unfortunately, known software emulators have been known to be relatively inefficient. In particular, in such known software emulators, legacy instructions are fetched for the upgrade microprocessor which uses a look up table to interpret the legacy instruction. Since each legacy instruction must be interpreted, computer systems which incorporate cache memory are known to suffer from relatively high probability of cache misses which decreases the overall throughput of the system.

SUMMARY OF THE INVENTION

It is an object of the present invention to provide an emulation system for emulating legacy instructions of a microprocessor with an incompatible instruction set which increases the throughput of the system relative to known emulators.

Briefly, the present invention relates to a method and apparatus for emulating instructions of a microprocessor ("legacy instructions") with an incompatible instruction set which provides increased throughput relative to known emulation systems. In particular, the legacy instructions are translated into direct vectors to software routines for each legacy instruction. Rather than fetching the legacy instruction and interpreting the instruction in software, the emulation system and method in accordance with the present invention fetches the direct vectors to the software routines which emulate the legacy instructions. The legacy instructions can either be translated by way of software when the legacy memory is loaded into main memory, or modified by way of hardware when the legacy memory is accessed. By fetching the direct vectors, the need for look-up tables for interpreting the legacy instructions is obviated. With no need to fill cache with lookup table accesses, the probability of cache misses is greatly reduced which increases the throughput of the system.

BRIEF DESCRIPTION OF THE DRAWING

These and other objects of the present invention will be readily understood with reference to the following specification and attached drawing, wherein.

DETAILED DESCRIPTION OF THE INVENTION

The present invention relates to a emulation system and method for emulating legacy instructions of an outdated ("legacy") microprocessor with a new upgrade microprocessor with an incompatible instruction set. In such applications, software programs are written which emulate each of the legacy instructions using instructions of the upgrade microprocessor. In known emulation systems, the emulation software causes the legacy instruction to be fetched and interpreted by the new microprocessor by way of the lookup table. As discussed in more detail below, such methodology has a significant impact on the throughput of the system. In order to increase the throughput of the system, the legacy instructions are translated into direct vectors to software routines or emulation code for emulating the legacy instructions. As such, as will be discussed in more detail below, the probability of cache misses is greatly reduced which results in increased throughput of the system.

Figure 1:
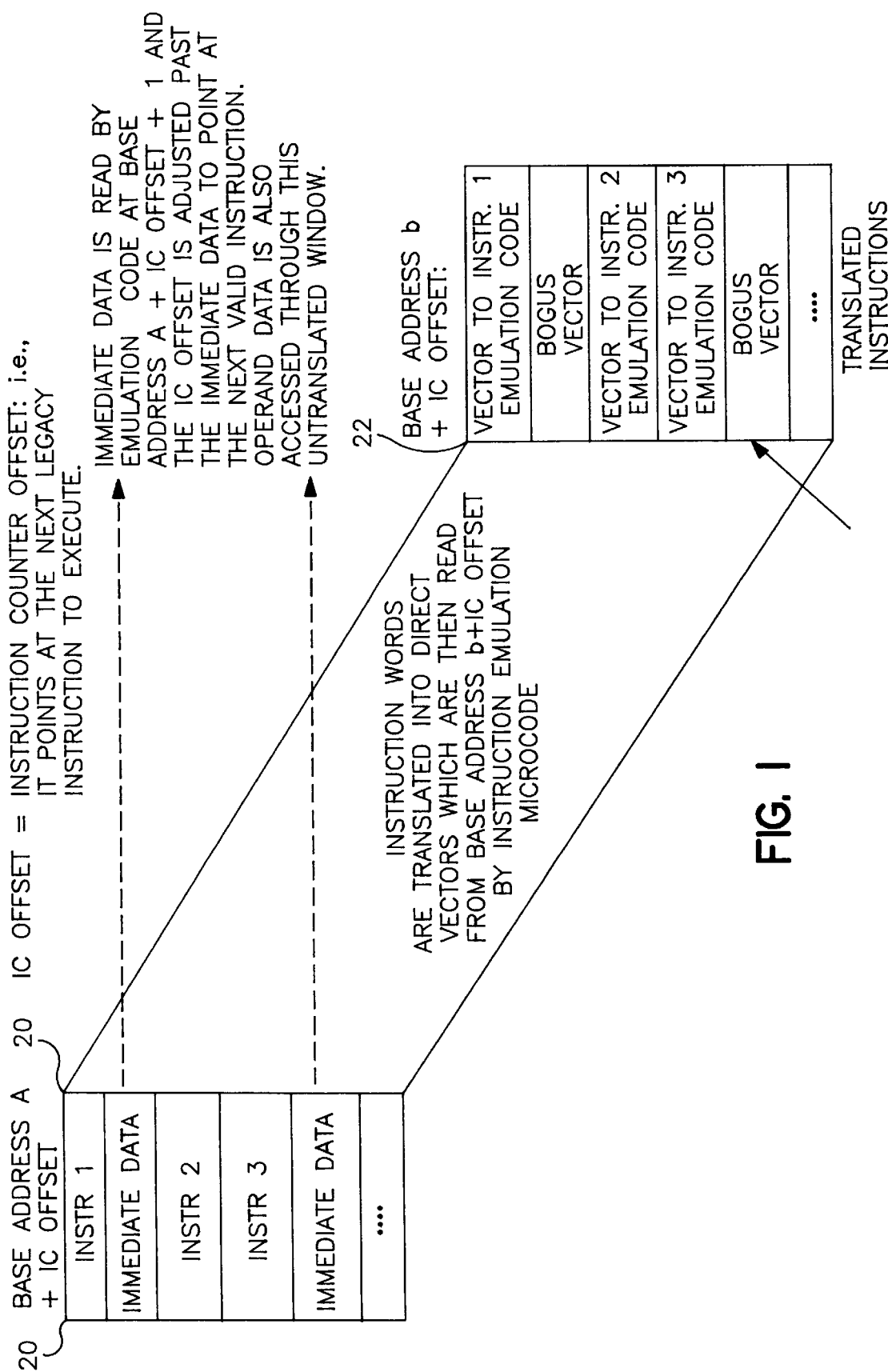
FIG. 1 is a block diagram illustrating the translation of the legacy instruction in accordance with the present invention.

Turning to FIG. 1, embedded software or code for a legacy microprocessor is generally identified with the reference numeral 20. Such code is normally stored in non-volatile read only memory (ROM). As shown, the ROM 20 includes legacy instructions, identified as INSTR 1, INSTR 2 and INSTR 3, etc. The ROM 20 also includes immediate data. The instructions INSTR 1, INSTR 2, INSTR 3, etc. plus the immediate data in the ROM 20, are located, for example, at a base address A within the memory space.

In accordance with an important aspect of the invention, each instruction (i.e. instruction INSTR 1, INSTR 2, INSTR 3, etc.) is translated to a direct vector to a software routine or emulation code for emulating the legacy instruction. For example, each legacy instruction is mapped or translated to another memory device 22, such as a ROM 22. The structure of the memory device 22 with respect to the instructions, is maintained the same as the ROM 20 but at a different base address B. In other words, instructions in the ROM 20 are located at a base address A plus an instruction counter (IC) offset which corresponds to the next legacy instruction to be executed. The instructions, INSTR1, INSTR 2, INSTR3, etc. are mapped to the ROM 22 at a different base address B but with the same IC offset.

The direct vectors in the ROM 22 can either be JUMP instructions to software routines for emulating the legacy instruction or address pointers. For example, the direct vectors can represent an offset pointer to an emulation microcode routine or a pointer to a table which contains a pointer to a microcode routine. Regardless, it is these vectors that are fetched by the emulation software rather than the legacy instructions.

The immediate data may be translated into bogus vectors in the ROM 22 which are not used by the emulation software. Rather, the emulation software in accordance with present invention may access the immediate data directly from the legacy code 20 by reading the data directly at the base address A plus instruction counter (IC) offset from the ROM 20.

Figure 2:
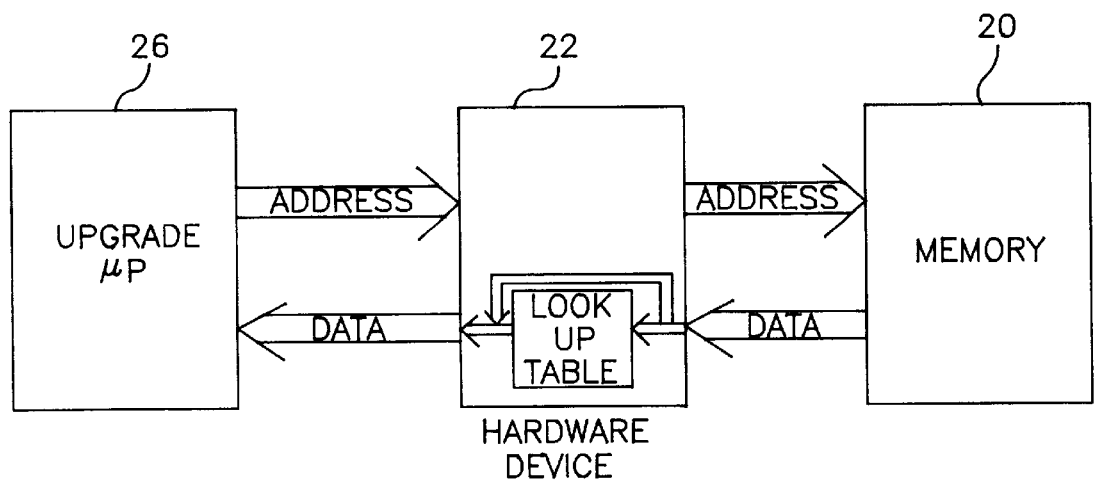
FIG. 2 is a block diagram illustrating one embodiment (in which vector translation is done by hardware) for translating the legacy instructions in accordance with the present invention.

Various methods are suitable for translating the legacy microcode. Both hardware and software methods for translating these instructions are suitable. FIG. 2 illustrates a hardware implementation in which a hardware device 24, such as a ROM containing a lookup table, is coupled to the data bus between an upgrade microprocessor 26 and the legacy microcode, i.e. ROM 20. The hardware device 24 is configured such that at any time an access to the legacy code is requested, i.e. base address B plus IC offset, the vector corresponding to the requested instruction is provided. Alternately, the decoder can be bypassed such that an access to the legacy code (i.e. base address A plus IC offset) will return the untranslated data. Thus, the upgrade processor can be directed to the associated emulation code routine by the fetched vector, or it can access immediate data directly from memory.

Figure 3:
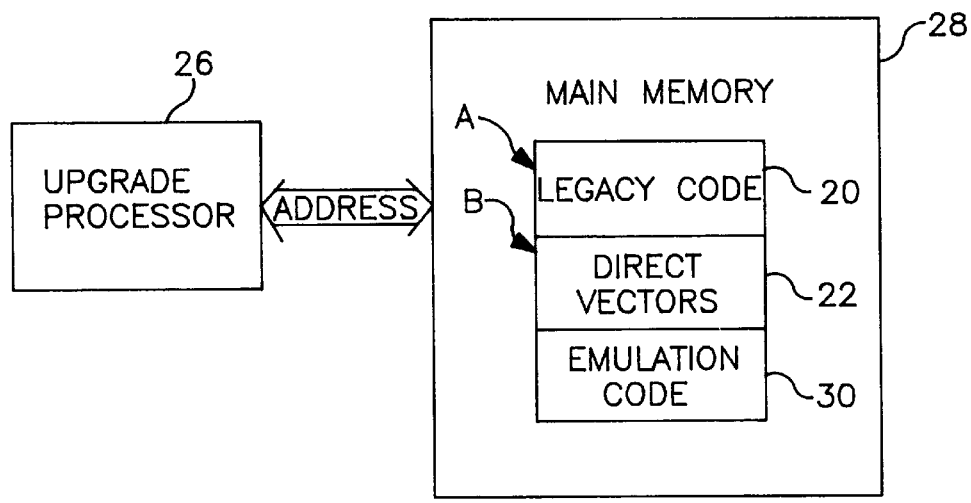
FIG. 3 is a block diagram illustrating the mapping of the legacy instructions to main memory.

In an alternate embodiment of the invention, the legacy emulation code may be translated by software when the legacy memory is loaded into main memory or modified. In particular, a software program, for example, a portion of the initialization software, is used to load the legacy code, into the computer system main memory 28 (FIG. 3) (e.g. at base address A). In this implementation, after loading the legacy microcode, the direct vectors (i.e. ROM 22) are loaded into the main memory 28 at another location (e.g. base address B), allowing the emulation code in the upgrade processor to access either the translated 22 or untranslated 20 legacy memory sections. The vectors retrieved from the translated memory 22 are used to point to the individual software routines in the emulation code 30. With this embodiment of the invention, the translated 22 and untranslated 20 legacy memory sections need not be disjoint, they might be interleaved, such that each vector immediately follows or proceeds the untranslated instruction.

As mentioned above, the configuration of the method and system for emulating legacy instructions is adapted to improve the throughput of the system. More particularly, many known microprocessors include cache memories in order to improve the throughput of the system. Software fetched from the main memory, is copied into the cache memory, which is much quicker than main memory. Thus, instructions stored in the cache memory can be executed much quicker than those stored only in main memory. Such cache memories are normally formed from high speed static random access memory (SRAM) and are used to store copies of data in the main memory or newly stored data.

Such cache memories operate on the principles that most programs execute instructions in sequence, and, due to loops, programs are likely to re-use recently fetched instructions. This principle is call locality of reference. Thus, instead of fetching a single instruction at a time, a cache memory system looks ahead and fetches blocks of instructions in sequence and stores the instructions for quick access.

In operation, all data stored in a cache memory is stored with what is known as an address tag. The address tag indicates the physical addresses of the data in the main memory that is being stored in the cache. whenever the microprocessor initiates a memory access, the address tags in the cache memory are first examined to determine if the particular data requested is already stored in the cache memory. When the data is found in the cache memory, this is known as a cache hit and data is immediately available to the microprocessor. If it is determined that the requested data is not in the cache memory, this condition is known as a cache miss. As a result of a cache miss, the requested data then must be retrieved from the main memory at a much slower rate.

Figure 4:
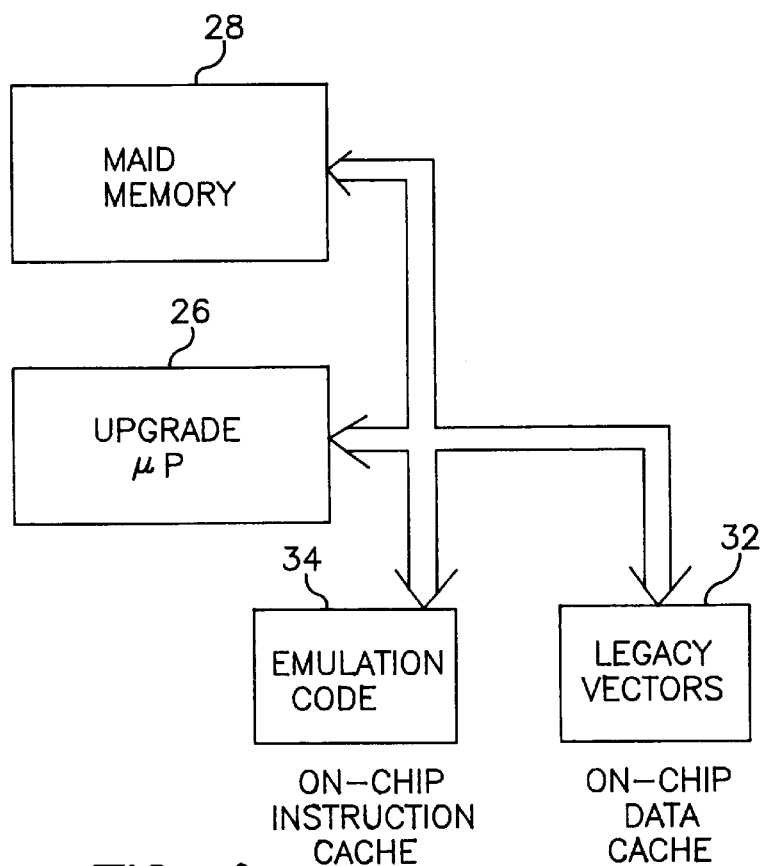
FIG. 4 is a block diagram of an upgrade microprocessor with cache memory for illustrating the operation of the cache system in accordance with the present invention.

FIG. 4 illustrates a typical configuration of a microprocessor with on-chip cache memory. In previous known systems, the known emulation software fetched the legacy instructions themselves. The legacy instructions were then interpreted by way of lookup table. Since the cache memory is based on the premise that a sequence of data will be requested in sequential memory locations, the use of the lookup table is not particularly efficient in cache memory systems and results in a relatively high probability of cache misses. By utilizing direct vectors, and because of effects of the locality principle in the legacy code and corresponding direct vectors, the probability of cache misses is greatly reduced thereby increasing the overall throughput of the system. More particularly, referring to FIG. 4, a memory system in accordance with the present invention is illustrated. As shown, the system includes the upgrade microprocessor 26 which includes two on-chip cache memories 32 and 34. One cache memory 32 is used for data, forming a data cache while the other cache memory 34 is used for instructions forming an instruction cache. The instruction cache 34 may be used almost exclusively for the emulation code. The data cache 32 may be used for the legacy code, direct vectors, and data.

In operation, a group of eight vectors may be fetched from main memory upon a cache miss and stored in the data cache 32 as part of the cache line refill operation. Since legacy instructions normally proceed in sequential order, the subsequent 7 requests for instruction vectors will normally be resident in the data cache 30. If the next legacy instructions to be executed is non-sequential but is within the last one thousand instructions to executed, (i.e. local loops), there is a high probability that the vector will still be in the data cache 30. This invention has reduced the probability of cache misses and thus increased the throughput of the system.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

What is claimed is:

1. An apparatus for emulating legacy instructions comprising:

means for emulating said legacy instructions, said emulating means including software routines for emulating said legacy instructions, the address of each software routine being identified by a vector;

means for translating said legacy instructions to direct vectors for said software routines for emulating said legacy instructions; and means for fetching said direct vectors in response to requests for said legacy instructions.

2. The apparatus as recited in claim 1, wherein said translating means is hardware based.

3. The apparatus as recited in claim 2, wherein said translating means includes a hardware device coupled between an upgrade microprocessor and said predetermined memory device for said legacy instructions.

4. The apparatus as recited in claim 1, wherein said translating means is software based.

5. A method for emulation legacy instructions with another microprocessor having an incompatible instruction set, the method comprising the steps of:

(a) storing emulation software routines for emulating legacy instructions;

(b) translating said legacy instructions to direct vectors for said emulation software routines for emulating said legacy instructions; and (c) fetching said direct vectors in response to requests for said legacy instructions.

* * * * *